United States Patent [19]

Grosseau

[11] Patent Number: 5,097,266
[45] Date of Patent: Mar. 17, 1992

[54] MLS-TYPE LANDING SYSTEM WITH CENTRALIZED MICROWAVE GENERATION

[75] Inventor: Alain Grosseau, Conflans, France

[73] Assignee: Thomson-CSF, Puteaux, France

[21] Appl. No.: 626,433

[22] Filed: Dec. 12, 1990

[30] Foreign Application Priority Data

Dec. 15, 1989 [FR] France .................. 89 16616

[51] Int. Cl.⁵ .................. G01S 13/91; G01S 1/16; G01S 1/18
[52] U.S. Cl. .................. 342/35; 342/36; 342/410; 342/413
[58] Field of Search .................. 342/35, 408, 410, 411, 342/412, 413, 36

[56] References Cited

U.S. PATENT DOCUMENTS

| | | | |
|---|---|---|---|
| 3,820,074 | 6/1974 | Toman | 340/151 |
| 4,568,942 | 2/1986 | Letoquart | 342/408 |
| 4,757,316 | 7/1988 | Brault et al. | 342/173 |
| 4,757,320 | 7/1988 | Letoquart et al. | 342/410 |
| 4,814,773 | 3/1989 | Wechsberg et al. | 342/368 |

OTHER PUBLICATIONS

NEC Research & Development, No. 59, 10/80, pp. 34-35, Tokyo, JP; G. Onodera et al, "Development of Approach Elevation Equipment in MLS", pp. 40-44, paragraph 6.

G.E.C. Journal of Research, vol. 2, No. 2, 1984, pp. 66-75, Longon, GB; J. R. Wallington et al, "Optical Techniques for Signal Distribution in Phased Arrays", pp. 67-69, paragraph 3.

Navigation, vol. 29, No. 114, Apr. 1981, pp. 174-187, Paris, France; B.

Letoquart, et al, "Le MLS, un Exemple d'utilisation du Mircrprocesseur", pp. 179-184, paragraphs 2,3.1.

IEEE Computer Society International Conference, Washington, D.C., 7-10 Sep. 1976, No. 13, pp. 264-268, New York, U.S., J. M. Hughes, "Multimicroprocessor Navigation Systems", pp. 265-266, le pargraphe Microwave Landing System.

*Primary Examiner*—John B. Sotomayor
*Attorney, Agent, or Firm*—Oblon, Spivak, McClelland, Maier & Neustadt

[57] ABSTRACT

The system comprises a central station assuring the generation of the microwave signals which must be transmitted by the different stations of an MLS. The signals thus generated in a centralized way are distributed to the different stations via an optical fiber network, the stations then assuring only the amplification and transmission of the signals.

8 Claims, 8 Drawing Sheets

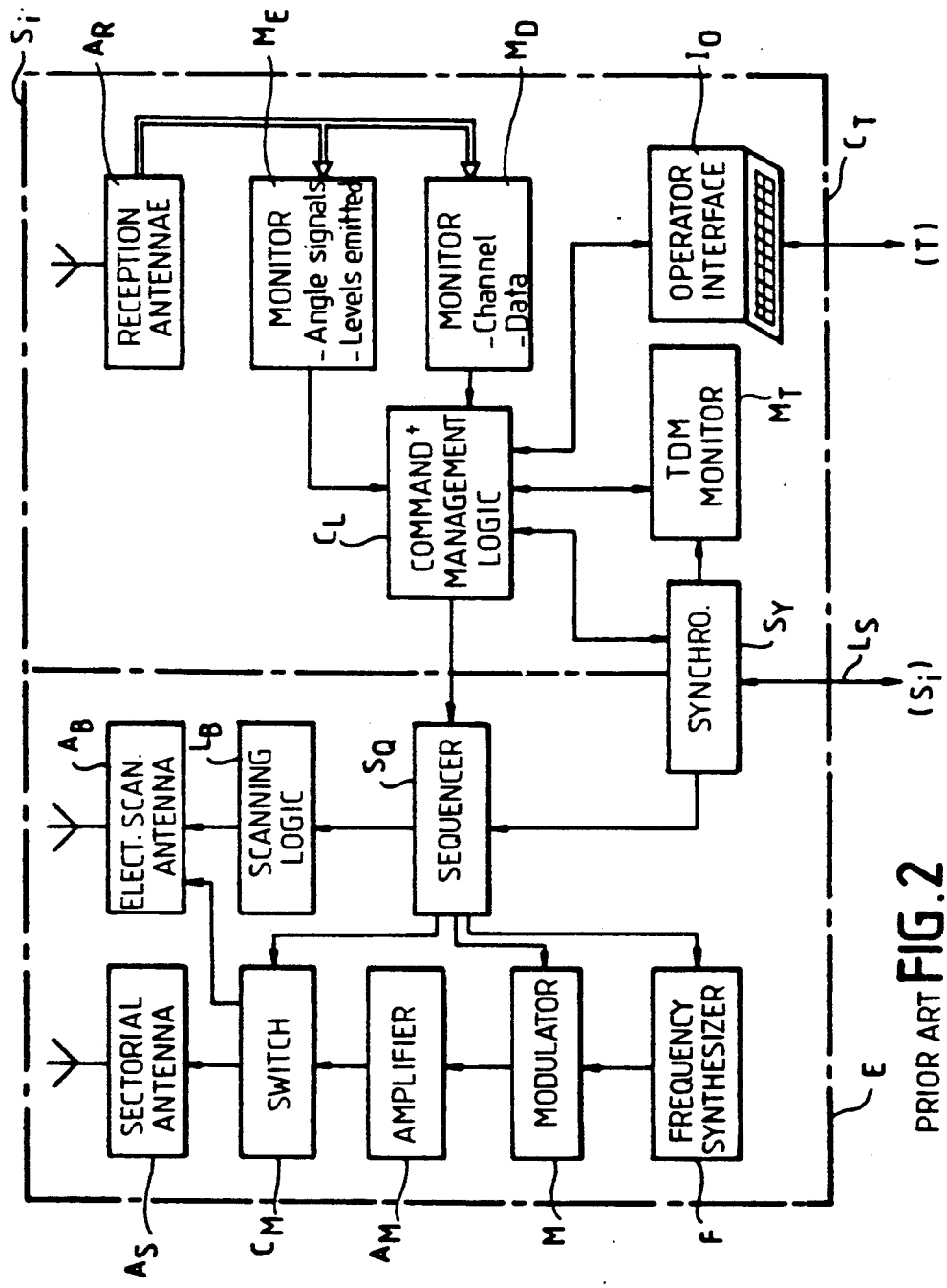
PRIOR ART FIG.2

MLS-TYPE LANDING SYSTEM WITH CENTRALIZED MICROWAVE GENERATION

BACKGROUND OF THE INVENTION

The present invention concerns the MLS-type landing systems. Its object is more particularly centralized generation of the microwave signals which must be transmitted by the different stations of an MLS.

We recall that the Microwave Landing System (MLS) is a system enabling an aircraft to be guided in to land by providing it with various items of information known as "functions". These comprise angular information, such as its angle of azimuth with respect to the axis of the runway, its angle of elevation with respect to the horizontal, if necessary other information such as rear azimuth for example, and a number of data, some of them "basic" and others "auxiliary". All this information is transmitted permanently from ground level in time-sharing at the same frequency, according to characteristics standardized by the ICAO (International Civil Aviation Organization), appendix 10 paragraph III.11. The ICAO's definition of an MLS also includes a DME (Distance Measuring Equipment). All this information is decoded by every interested aircraft.

Each of the above functions is divided into two parts, which are transmitted one after the other:

A preamble, whose role is to provide the aircraft with an identification of the function which is to follow. This preamble is transmitted by a sectorial antenna, i.e. a fixed antenna transmitting to the whole of the zone, or sector, which the MLS must cover. According to the ICAO standards, the preamble is in the form of a twelve-bit word enabling biunique identification of each function. This binary word is transmitted in DPSK phase modulation (Differential Phase Shift Keying).

The function itself: if this function is a datum, it is transmitted by the sectorial antenna also in DPSK phase modulation. If it is an item of angular information it is constituted of two pulses transmitted using an electronic scanning antenna, according to the principle known as the time-reference scanning beam, which is notably described in French patent application no. 2 549 321 in the name of THOMSON-CSF.

An MLS therefore has at least as many stations as angular functions to be transmitted.

It is seen then that the various items of information required for guidance of an aircraft are transmitted by different stations in succession at the same frequency. It is clear that the order and duration of the transmissions must be strictly adhered to for guidance safety to be ensured, especially during landing, which is a particularly delicate operation. In particular, any overlapping of transmissions must be carefully avoided. To guarantee this security, many devices and solutions are known which make use of:

great redundancy of equipment;
synchronization links between the stations, preferably also redundant;
numerous surveillance loops checking the transmissions.

These different solutions tend to multiply and complicate the equipment and circuits; their major disadvantage is that they reduce the reliability of the system.

SUMMARY OF THE INVENTION

The present invention proposes to increase the safety of an MLS without reducing its reliability.

For this purpose, according to the invention, the microwave signals to be transmitted are generated in a centralized and sequential way and are then distributed to the different MLS stations using a network of optical fibers, the stations then performing only amplification and transmission.

In this way, the signal generation being centralized and sequential, the time-sharing multiplexing is ensured automatically without additional equipment. On the contrary, it appears that the amount of equipment is reduced, thus increasing the reliability of the system and reducing its cost.

BRIEF DESCRIPTION OF THE DRAWINGS

Other objects, characteristics and results of the invention will appear from the following description, given as a non-restrictive example and illustrated by the appended drawings, which represent:

FIG. 2, a synoptic diagram of an MLS station of known type.

In all these figures the same references refer to analogous elements.

DESCRIPTION OF THE PREFERRED EMBODIMENTS

Figure 1:
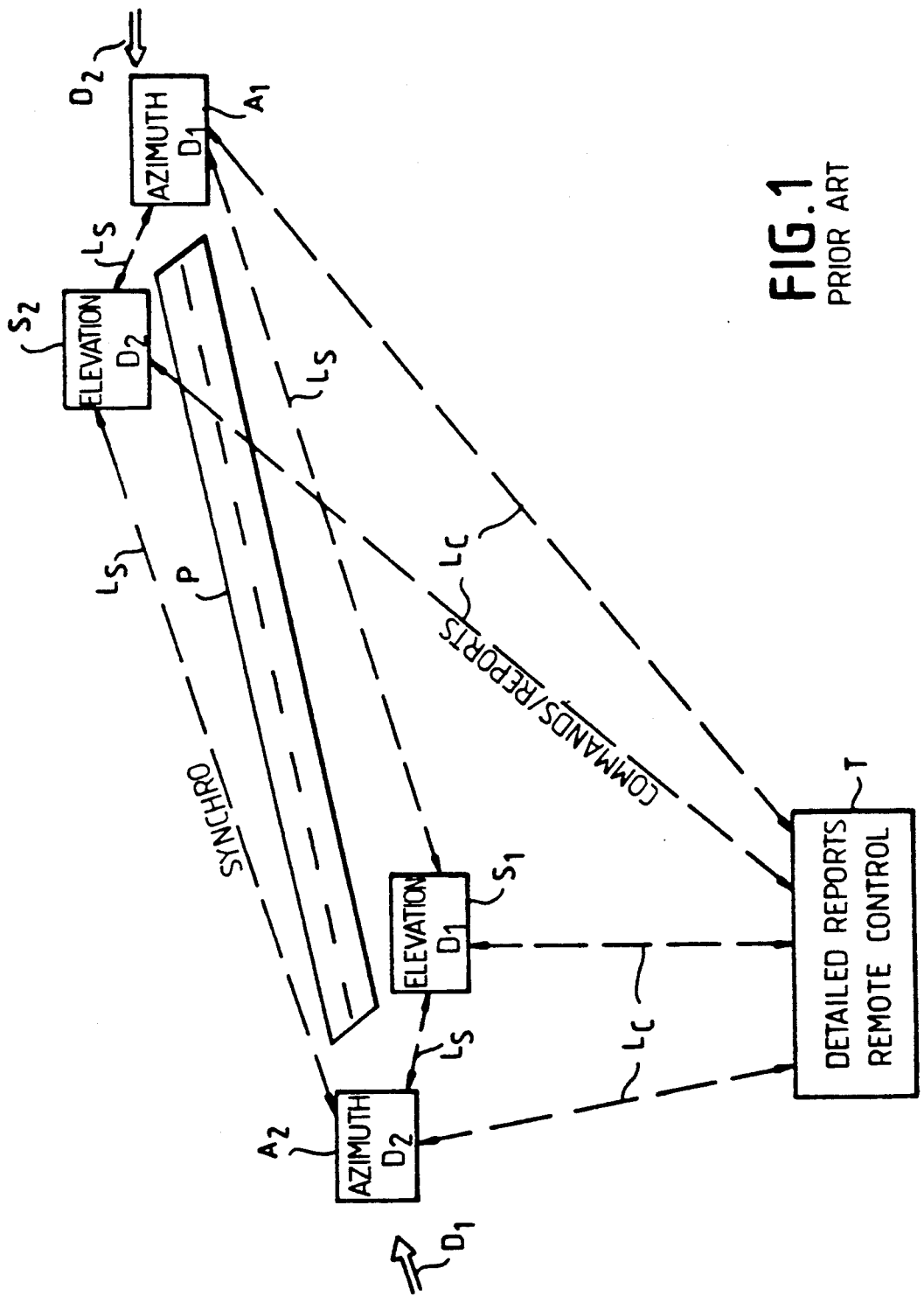
FIG. 1, a diagram of the siting of an MLS of known type.

FIG. 1 is therefore a diagram showing conventional siting of an MLS.

This system is composed of a set of MLS stations arranged around a runway, referenced P, which is usually several kilometers long. For a given direction of use of the runway P, for example direction $D_1$, the azimuth angle information is given by a first station $A_1$, placed in the axis of the runway and at the other end of it from the point of landing (or runway approach end). The elevation angle information is given by a second station, referenced $S_1$, which is near the runway approach end and preferably to the side of it. If rear azimuth information is required, the system has a third station, referenced $A_2$, which is placed in the axis of the runway at the runway approach end. When the runway can be used in the other direction (arrow $D_2$), the system has a second set of two stations, azimuth and elevation respectively. The azimuth station for direction $D_2$ can be the same station $A_2$ as that which provides the rear azimuth information for direction $D_1$. The elevation information for direction $D_2$ will be given by a fourth station, referenced $S_2$, in the neighborhood of the runway approach end in direction $D_2$, in the same way as station $S_1$. In addition, distance measuring equipment DME is necessary for each runway direction. It is generally placed in the azimuth station ($A_1$, $A_2$), although this is not necessarily the case. Such DME equipment is for example described in French patent application no. 2 576 111 in the name of THOMSON-CSF.

In order to prevent the transmissions from these different stations from overlapping, all the stations likely to be in use for a given runway direction are connected by synchronization links, represented in the figure by dashed lines and referenced $L_s$.

In addition, these different stations are connected to a control room T by links $L_c$, shown by dashed lines, which give an operator remote control of the operation of the stations and enable the operator to receive their detailed reports.

FIG. 2 is a synoptic diagram of an MLS station of known type.

Such a station is responsible for transmitting one of the MLS functions (azimuth, elevation, rear azimuth . . . ). It is referenced $S_i$ and represents one of the MLS stations in FIG. 1 ($S_1$, $S_2$, $A_1$ or $A_2$).

This station $S_i$ comprises essentially two parts, one part on the left of the figure, referenced E, comprising the station's means of transmission, and one part on the right of the figure, referenced $C_T$, comprising the means of control of the operation of the station.

The transmitting part E comprises, in cascade:

A frequency synthesizer F, giving a sinusoidal signal destined to form a carrier wave, whose frequency is close to 5 GHz according to the ICAO standard (according to this standard, one frequency, or channel, among 200 predefined frequencies close to 5 GHz, is assigned to each MLS system).

A modulator M of the signal supplied by the synthesizer F, which performs a two-state DPSK phase modulation, enabling the preamble and the data to be transmitted.

A microwave amplifier $A_H$, using tubes or transistors depending on the power required. This is conventionally about 20 Watts and therefore the amplifier usually uses transistors.

A switch $C_M$, connected both to a sectorial antenna $A_s$ and an electronic scanning antenna $A_B$ and, if required, to antennae (not shown) known as OCI (Out of Coverage Indicator), whose function is to indicate to the aircraft that, being outside the zone covered by the MLS system, it must ignore the signals it receives. The role of the switch $C_M$ is to switch the signal produced by the previous chain towards one of the antennae.

The means of transmission E also includes a sequencer $S_Q$, which controls the parts F, M, $A_H$ and $C_M$, as well as the electronic scanning antenna $A_B$ via a scanning logic circuit $L_B$.

In this way and under the control of the sequencer $S_Q$, the means of transmission F to $A_H$ supply a signal, via the switch $C_M$, either to the sectorial antenna $A_s$ for transmission of the preamble and the data, to the electronic scanning antenna $A_B$ for transmission of the angular information, or to the OCI antennae for indications of an out of cover situation.

The control part $C_T$ of the MLS station comprises:

A set of reception antennae $A_r$, or sensors, to receive the signal as transmitted by the station $S_i$. This unit can comprise an external sensor, for example a horn antenna, analogous to the receiver carried by the guided aircraft, placed at a few tens of meters from the antennae. It can also comprise a signal sampling device situated at each of the antennae, known as an integral monitor.

A set of three monitors: $M_E$, $M_D$ and $M_T$, each of which performs predefined tests on the information it receives from the reception antennae $A_R$, i.e. they perform measurements on these items of information and compare them with reference values in their memories. When the differences between the results of measurement and the reference values exceed predefined limits, the monitors give an alarm signal for the data for which they are responsible. The monitor $M_E$ is responsible for the surveillance of the levels of the signals transmitted by the antennae and the position of the pulses corresponding to the angular information. The monitor $M_D$ is responsible for surveillance of the transmission frequency which must, as noted above, correspond to a predetermined MLS channel, and the preambles and data transmitted by the sectorial antenna. The monitor $M_T$, known as a TDM monitor, is responsible for surveillance of the time-sharing multiplexing of the various items of MLS information;

Logic circuits $C_L$ for control and management, generally constituted of a microprocessor, receiving the signals from the various monitors and consequently controlling the on/off status of the station via one or more of the elements F, M, $A_H$, $C_M$ and $S_Q$.

The control part also includes means $I_O$ for interfacing with an operator, these means being connected to the control logic circuits $C_L$ and able to exchange remotely-controlled orders and reports with the control room T (FIG. 1).

The station described here is composed of a single transmission chain. For reasons of availability, safety or reliability, it can of course be doubled. This leads to the creation of a second chain E and to the corresponding modification of the means assuring the functions of control, command and management.

The station $S_i$ also comprises a circuit $S_y$ for transmission and reception of the synchronization information transmitted via the links $L_s$ from the other stations $S_i$ of the MLS system. In order to ensure synchronization between the stations $S_i$, one of the solutions possible is that each of the stations sends one (or more) synchronization pulse(s) to the station coming after it in the order of transmissions, on command by the logic unit $C_L$ and via the circuit $S_y$ and the link $L_s$. The reception of this pulse by the circuit $S_y$ of the station concerned, possibly after a predefined delay, triggers the transmission via the sequencer $S_Q$. It can also trigger the sending of an acknowledgement to the station which transmitted the synchronization pulse. More generally, the aim of the synchronization is to ensure the sequencing of the transmissions according to the ICAO standards, using exchanges of orders and reports on the network of links $L_s$. Moreover, the monitor $M_T$ carries out surveillance of the multiplexing on the basis of the information it receives from the circuit $S_y$ and from its own station.

It appears then that the non-overlapping of the different MLS transmissions rests entirely on the reception of synchronization pulses, with the risk inherent in this type of process.

Figure 3B:
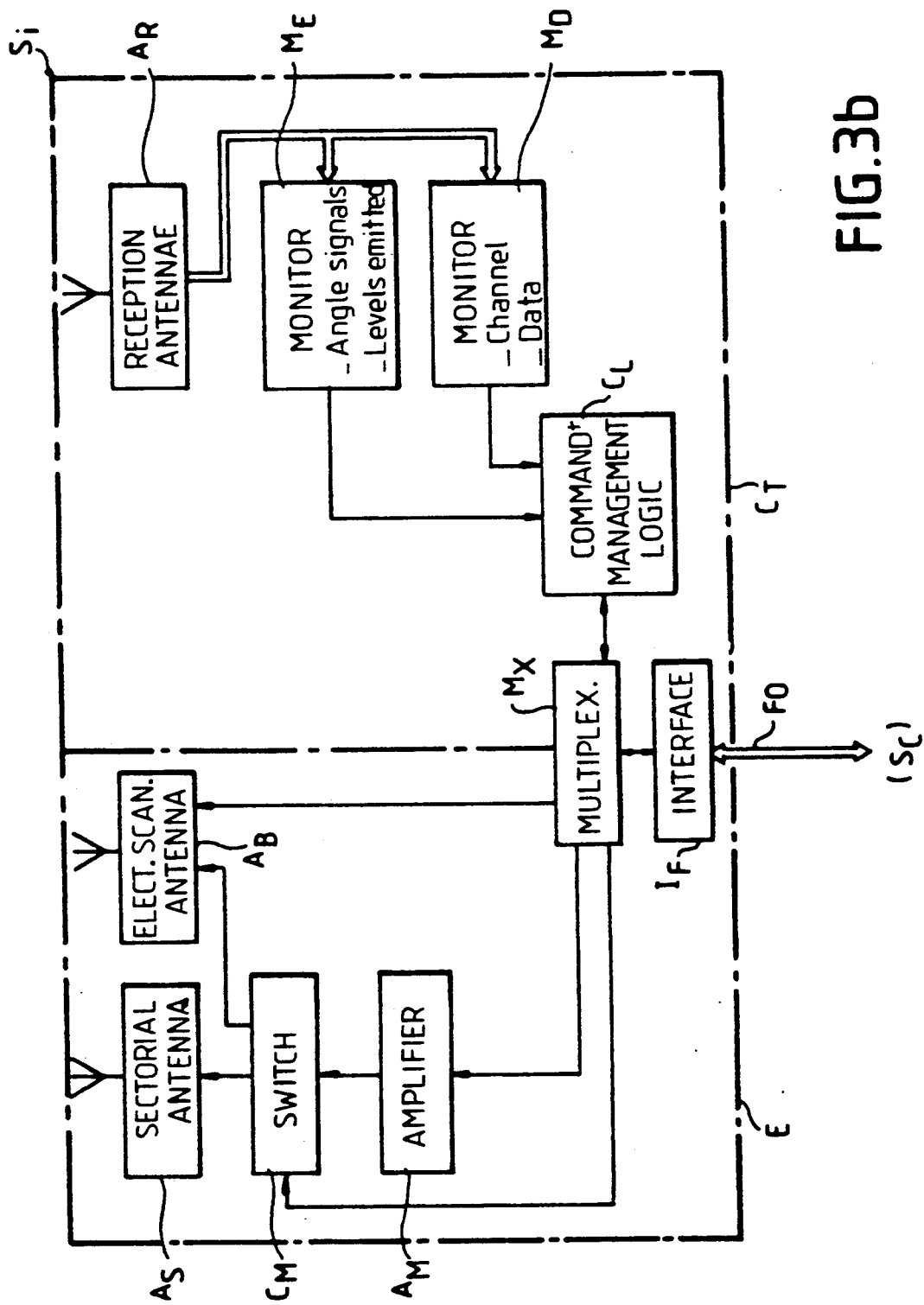
FIGS. 3a and 3b, a first embodiment according to the invention of a central signal generating station and an MLS station adapted to it.
Figure 3A:
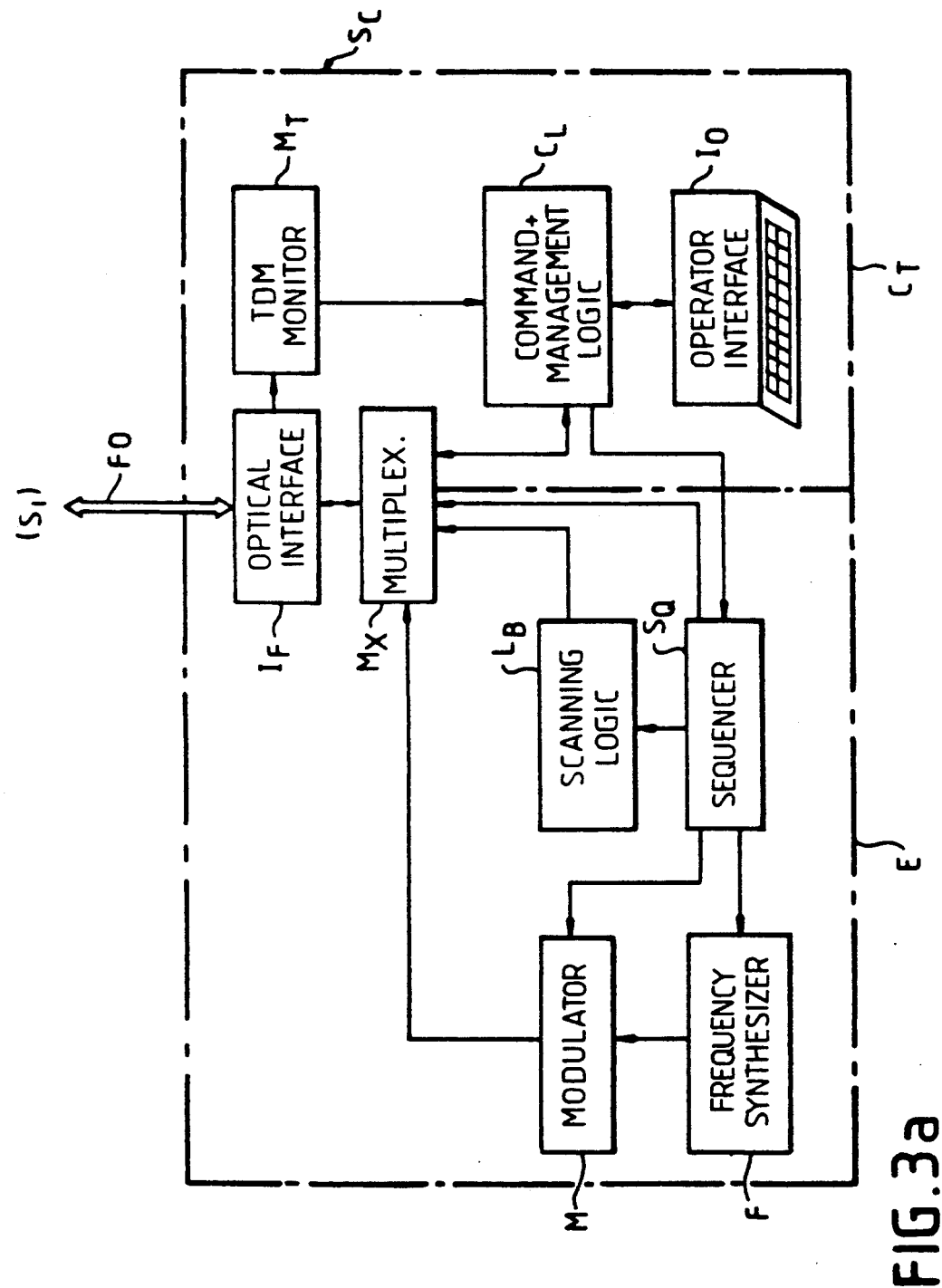

FIG. 3a represents a first embodiment of a central station for the generation of MLS signals according to the invention.

The central station, referenced $S_c$, comprises, in an transmission part E, a frequency synthesizer F and a phase modulator M analogous to those of conventional MLS stations (FIG. 2), which provide a modulated microwave signal under the control of a sequencer $S_Q$ analogous to that in FIG. 2. The signal is sent to multiplexing-demultiplexing means $M_x$. The transmission part E also comprises a scanning logic circuit $L_B$ analogous to that in FIG. 2, controlled by the sequencer $S_Q$ and supplying its control signals to the multiplexer $M_x$.

The means $M_x$ performs the multiplexing of the information which arrives, in any known form and by any known means, and transmits it to an optical interface circuit $I_F$ which transforms the received signal into an optical signal intended to spread on an optical fiber network referenced FO, to the MLS stations $S_i$. At the same time, an optical signal received by the station $S_c$ is converted into an electrical signal by the interface $I_F$ and demultiplexed by the means $M_x$. Typically, the interface $I_f$ comprises a diode laser, assuring the conversion of an electrical signal into an optical signal, and a photo-diode, assuring the conversion of the optical signal received into an electrical signal. The optical fiber network FO can be of any known type, for example with a star or ring topology, or formed by a set of point-to-point links. In a preferred embodiment, the multiplexing is performed as follows: the microwave signal modulated by the modulator M directly modulates the frequency of the optical wave emitted by the diode laser of the interface $I_F$, and the other information to be transmitted on the network FO is multiplexed and transmitted by any means in the remaining pass band of the optical link.

The central station $S_c$ also comprises a control part $C_T$, which includes an operator interface $I_o$ connected to a central command and management logic device $C_L$. The device $C_L$, as before, enables the sequencer $S_Q$ to be controlled and makes it possible to converse with the stations $S_i$ via the multiplexer $M_x$, the interface $I_F$ and the network FO. The latter also receives the signals from a TDM monitor $M_T$ analogous to that in FIG. 2. This monitor receives from the interface $I_F$ the totality of the signal transmitted by the emission part E. This can be done either using an optical coupler sampling the transmitted signal on the optical network FO, or using a microwave coupler sampling the signal before its conversion into optical form.

FIG. 3b represents an MLS station $S_i$, adapted to receive the signal transmitted by the central station $S_c$ in the preceding figure.

The station $S_i$ also has a part E, which comprises transmission means of the station, and a part $C_T$, comprising its control means.

The transmission part E, with respect to the diagram in FIG. 2, now comprises only the microwave amplifier $A_H$, the switch $C_M$, the sectorial antenna $A_S$, the electronic scanning antenna $A_B$ and the OCI antennae (not shown).

The control part $C_T$ comprises, as described in FIG. 2, the reception antennae $A_R$ and two of the monitors, $M_E$ and $M_D$, but no longer includes the monitor $M_T$ which is now situated in the central station $S_c$. The two monitors supply their signals to the command and management logic circuit $C_L$. Circuit $C_L$ in its turn supplies information on good or bad operation to the central station $S_c$, via a multiplexing-demultiplexing means $M_x$ and an optical interface $I_F$, analogous to those of the central station $S_c$, and the optical fiber network FO.

The assembly formed by the central station $S_c$ (FIG. 3a) and the MLS stations $S_i$ (FIG. 3b) functions as follows.

Under the control of its command logic unit $C_L$ and its sequencer $S_Q$, the central station $S_c$ generates a signal at the appropriate MLS frequency, suitably modulated, representing in sequential form the signal to be transmitted successively by the different MLS stations. It should be noted that the signals sent to the different stations are, if necessary, suitably delayed with respect to each other to take into account the differences in propagation time within the optical network FO. On this microwave signal are superimposed, as we saw above, control signals from the switches $C_M$ and the electronic scanning antennae $A_B$ of the MLS stations $S_i$, signals generated by the sequencer $S_Q$ and the scanning logic $L_B$ of the central station $S_c$, and the command and control signals coming from the unit $C_L$ of the central station.

Each of the MLS stations $S_i$ then only has to amplify the relevant signal and ensure transmission of the waves.

It appears that thus, as all the signals are generated sequentially at the same point, the synchronization of the different transmissions is performed automatically, the TDM monitor $M_T$ of the central station only having to verify that the transmission part E of this station is operating correctly. The safety of the system is thus greatly improved.

Moreover, this increase in safety is not gained by an increase in the complexity of the system, but, on the contrary, is accompanied by a reduction in the number of circuits necessary for a given redundancy: henceforth only one of each of the parts F, M, $L_B$ and $S_Q$ is required in the central station $S_c$, whereas before one was needed for each of the MLS stations $S_i$.

One consequence of this is an increase in reliability. It is known that the reliability of a chain of sub-assemblies is an inverse function of the number of sub-assemblies making up the chain. More precisely, if the failure rate of a sub-assembly i is $p_i$, the probability P of operation of the chain at the instant t is:

$$P = e^{-pt} \text{ where } p = \sum_i p_i$$

For a redundant chain, where the sub-assemblies are doubled, $e^{-p_i t}$ is replaced by $(2e^{-p_i t} - e^{-2p_i t})$.

Moreover, the safety of the system does not depend only on the risk of overlapping of the transmissions. It also depends on the risk of sending out an erroneous and therefore dangerous signal. The probability $P_R$ of sending out such a signal is the product $$P_R = P_{em} \cdot P_{pc}$$

where: $P_{em}$ is the probability of a failure of the transmission unit (restricted to the case of a dangerous signal); it is an inverse function of the reliability of the emission unit; and where: $P_{pc}$ is the probability that a failure is not seen by the control unit (failure hidden from the control unit); this is an inverse function of the reliability of the control unit.

Safety is therefore a function of the product of the reliability of the transmission unit by the reliability of the control unit. It is therefore increased by the improvement in the reliability of the transmission unit.

Finally, another consequence of the reduction in the number of circuits is of course a reduction in the cost of the system.

Figure 4B:
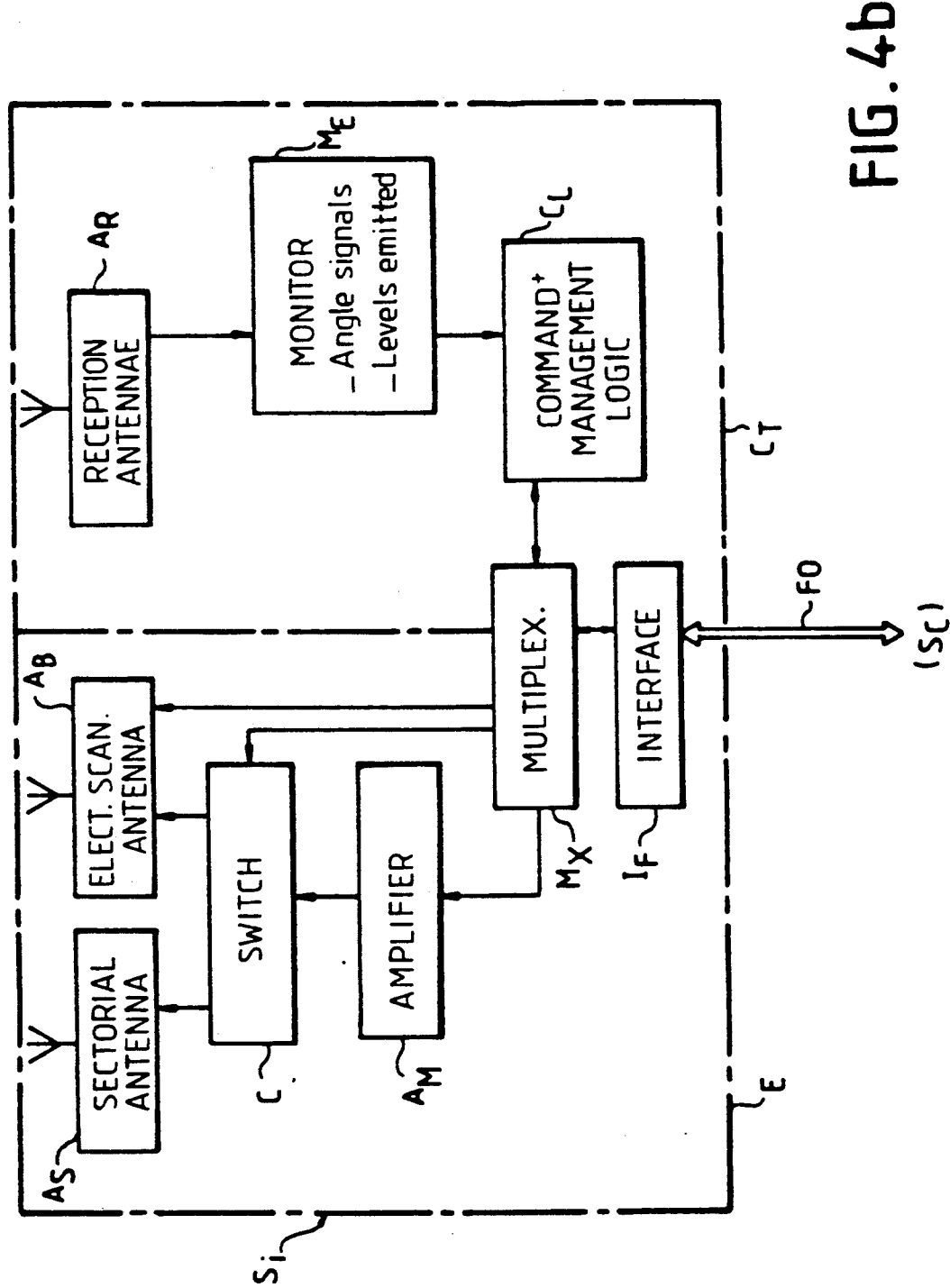
FIGS. 4a and 4b, a second embodiment according to the invention of a central signal generating station and an MLS station adapted to it.
Figure 4A:
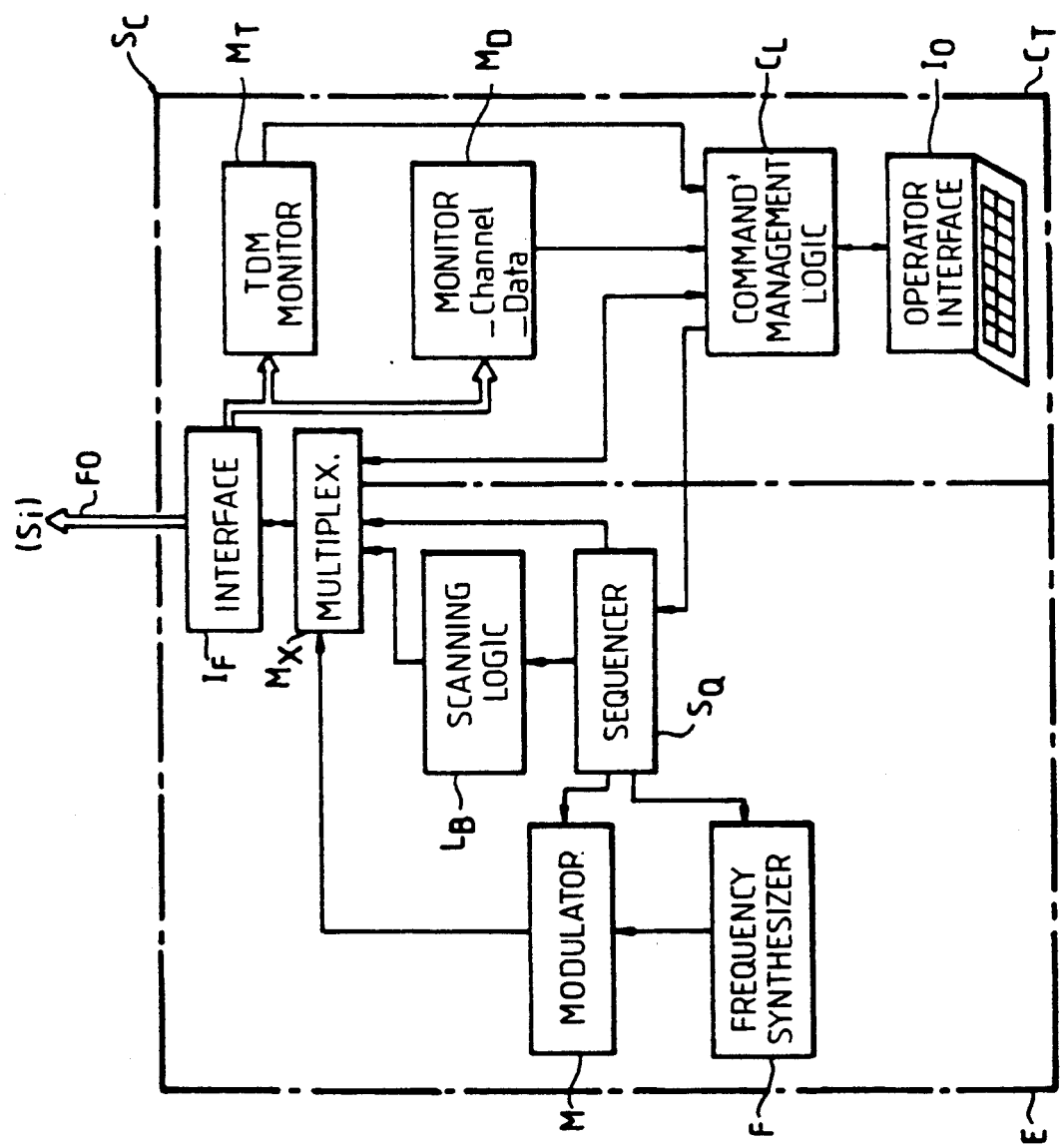

FIG. 4a represents a second embodiment of a central generation station according to the invention.

As before, the central station $S_c$ comprises an transmission part E and a control part $C_T$.

The transmission part E is identical to that described with respect to FIG. 3a.

The control part $C_T$ comprises, as described with reference to FIG. 3a, the operator interface $I_o$ and the logical means of command and management $C_L$, which receive the signals from the TDM monitor $M_T$, but also from the monitor $M_D$, which is supplied like the monitor $M_T$.

FIG. 4b is the diagram of an MLS station adapted to receive the signals transmitted by a central station such as that described with reference to FIG. 4a.

This station $S_i$ also comprises an transmission part E and a control part $C_T$.

The transmission part E is identical with that described with reference to FIG. 3b.

The control part $C_T$ still has the reception antennae $A_R$ and a command and management logic $C_L$, but now has only one monitor $M_E$, the other two now being in the central station $S_c$ (FIG. 4a).

As before, exchanges with the central station are made via the means $M_x$ and the optical link interface $I_F$, both for the transmission part E and for the control part $C_T$.

This second embodiment, which integrates the monitor $M_D$ into the central station, this monitor being responsible for checking the carrier frequency and the data, accentuates the previously-described effects, i.e. a reduction in equipment and an increase in reliability.

Figure 5A:
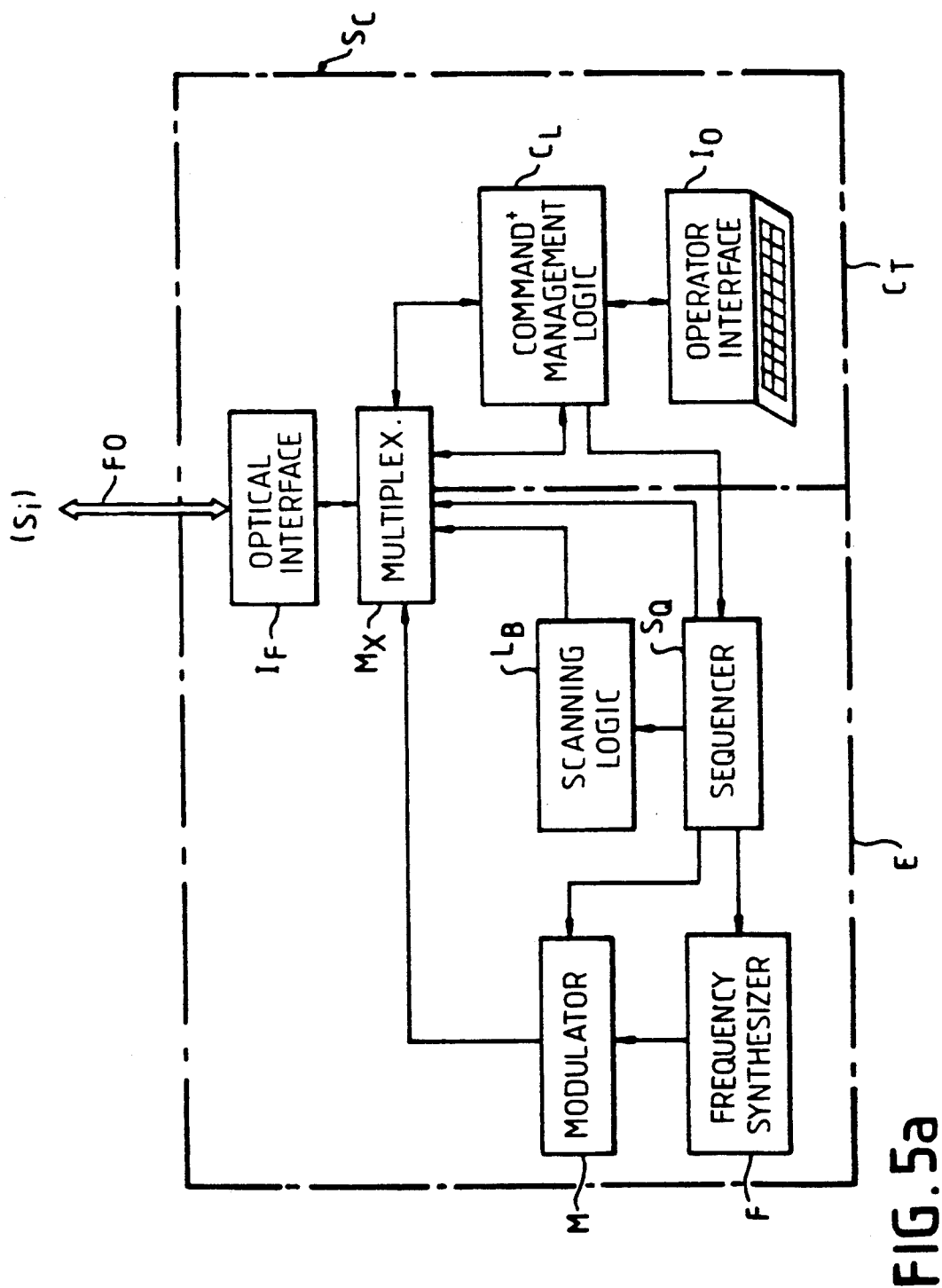
FIGS. 5a and 5b, a third embodiment according to the invention of a central signal generating station and an MLS station adapted to it.

FIG. 5a represents a third embodiment of a central generation station according to the invention.

As before, the central station $S_c$ has a transmission part E and a control part $C_T$.

The transmission part E is identical to that described with reference to FIG. 3a.

The control part $C_T$ here comprises only the operator interface $I_o$ and the logical means of command and management $C_L$, which receive the signals supplied by the optical network FO via the interface $I_F$ and the means $M_x$.

Figure 5B:
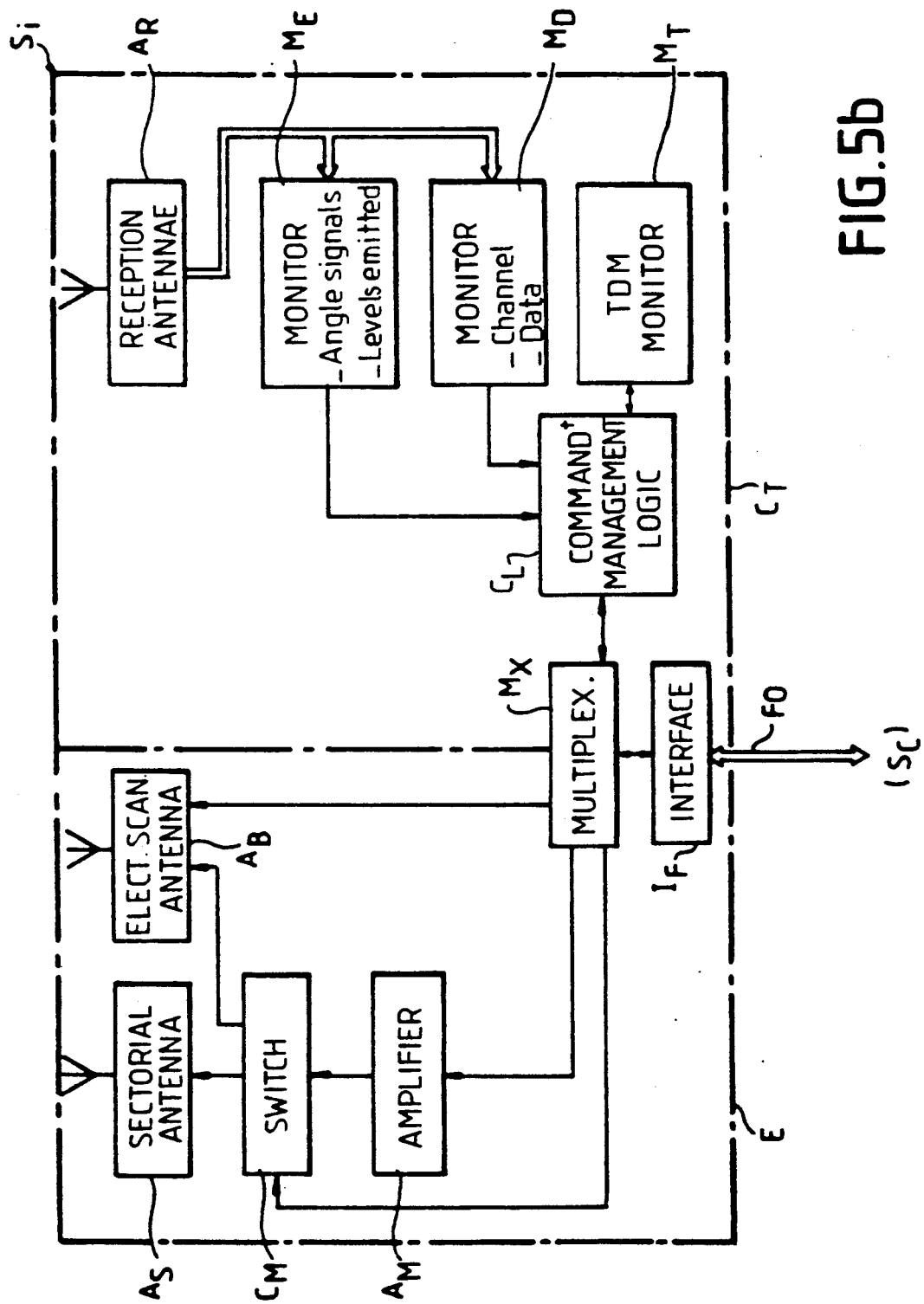

FIG. 5b is the diagram of an MLS station adapted to receive the signals transmitted by a central station such as that described with reference to FIG. 5a.

This station $S_i$ again comprises a transmission part E and a control part $C_T$.

The transmission part E is identical to that described with reference to FIG. 3b.

The control part $C_T$ comprises the same elements as those described with reference to FIG. 3b plus a TDM monitor $M_T$, connected to the command logic $C_L$.

As before, the exchanges with the central station are performed via the means $M_x$ and the optical link interface $I_F$, both for the transmission part E and for the control part $C_T$.

In this embodiment, the central station has no TDM monitor. This monitor is not indispensable: it has the double function of, first, verifying that the transmissions from the stations do not overlap, which is ensured by the principle of the invention itself, and second, that the order of transmission of the stations conforms to the standard: this can be verified in the central station (FIG. 3a) or in the stations $S_i$ (FIG. 5b) or not at all, if the parts concerned are considered to be sufficiently safe.

The invention is of course not restricted to the embodiments described above. In particular, the transmission of information in the optical network FO has been described via multiplexing-demultiplexing means, but this is not indispensable. It can be replaced for example by an optical link constituted of several optical fibers, each fiber being assigned to one type of information.

What is claimed is:

1. MLS-type landing system, consisting in transmitting to an aircraft, in time-sharing multiplexing on a single carrier frequency, information known as functions, comprising successively a preamble and either data or angular information, the system comprising at least two MLS stations, each of which said stations comprising:
    a sectorial antenna, for the transmission of the preambles and data, in the form of phase-modulation of said carrier wave;
    an electronic scanning antenna, for the transmission of the angular information, in the form of sweeping of a beam of wave at the carrier frequency;
    means for controlling the MLS station operation; the system further comprising a central station, said central station comprising transmission means, connected to the MLS stations by at least one optical fiber; said transmission means of the central station comprising:
    means for generating a signal at the carrier frequency;
    means for modulating said signal by the preambles and data;
    said central station further comprising means for interfacing the transmission means with the optical fiber; each of said MLS stations having transmission means and means for interfacing said optical fiber with the transmission means, said transmission means comprising:
    amplification means for the signals received from the central station;
    a switch for switching amplified signals between the sectorial antenna and the electronic scanning antenna.

2. System according to claim 1, wherein said central station and said MLS stations further comprise multiplexing-demultiplexing means connected to said interface means.

3. System according to claim 1, wherein the central station further comprises means for controlling the operation of the system, said controlling means comprising:
    coupling means which gives a control signal representing the signal transmitted on the optical fiber by the central station to the MLS stations;
    logical means for command and management of the central station and the MLS stations.

4. System according to claim 3, wherein the central station further comprises first monitor means connected to said coupling means and said logical means, for controlling of the time-sharing multiplexing of the MLS functions.

5. System according to claim 3, wherein the central station further comprises second monitor means connected to said coupling means and to said logical means, for the controlling of the carrier frequency and of the data.

6. System according to claim 1, wherein the control means of each of the MLS stations comprises:
    means for receiving the signals transmitted by the MLS station;
    third monitor means for assuring control of the angular information and the level of the signals transmitted, connected to the reception antenna;
    logical means for command and management of the MLS station, connected to the control means and to the multiplexing-demultiplexing means.

7. System according to claim 6, wherein said control means of each of the MLS stations further comprises second monitor means for controlling of the carrier frequency and the data, connected to the reception antenna and to the logical means.

8. System according to claim 7, wherein said control means of each of the MLS stations further comprises first monitor means for controlling of the time-sharing multiplexing of the MLS functions, connected to the logical means and to the coupling means.

* * * * *